June 7, 1927.　　　　E. H. FAHRNEY　　　　1,631,194
CREAM SEPARATOR
Filed Jan. 28, 1926　　　2 Sheets-Sheet 1
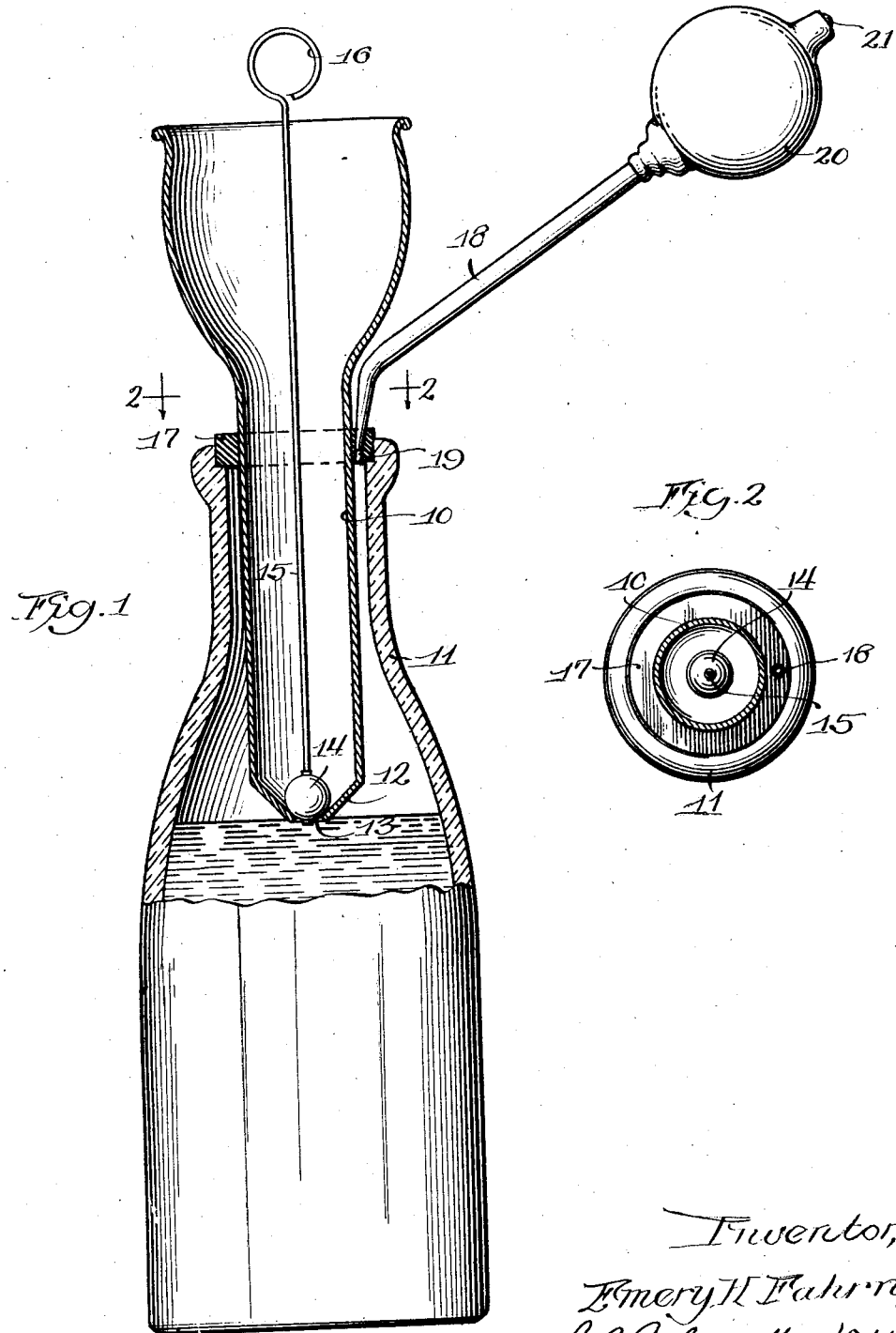

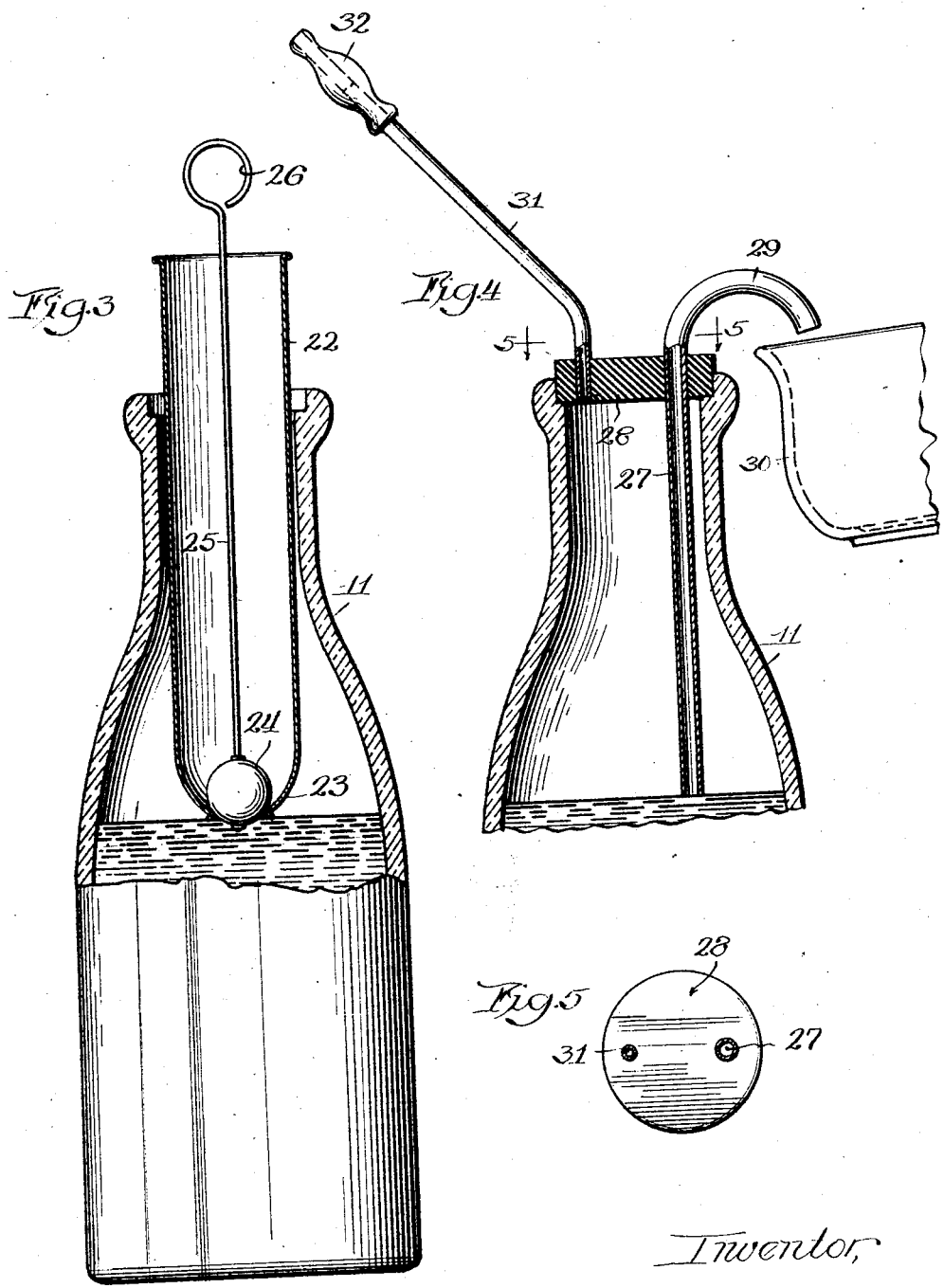

Patented June 7, 1927.

1,631,194

UNITED STATES PATENT OFFICE.

EMERY H. FAHRNEY, OF CHICAGO, ILLINOIS.

CREAM SEPARATOR.

Application filed January 28, 1926. Serial No. 84,291.

This invention relates to improvements in cream separators and one of the objects of the invention is to provide an improved, simple, and efficient device of this character by means of the use of which cream may be removed from the top of milk in a bottle or container, without disturbing the contents of the bottle below the milk line.

A further object is to provide an improved device of this character which may be readily employed for removing any desired amount or proportion of the cream from the top of the milk, and which device is adapted to be placed into a bottle or container and adjusted so that it may be set to remove the cream for any desired depth.

A further object is to provide in an improved device of this character, means whereby a blast or current of air may be directed into the bottle or container, and thereby facilitate in the separation of the cream from the milk.

A further object is to provide an improved device of this character which will be of a cheap and sanitary construction and which may be readily manipulated.

To the attainment of these ends and the accomplishment of other new and useful objects as will appear, the invention consists in the features of novelty in substantially the construction, combination, and arrangement of the several parts, hereinafter more fully described and claimed and shown in the accompanying drawings illustrating this invention, and in which;

Figure 1 is a view partly in vertical section and partly in elevation of a device of this character constructed in accordance with the principles of this invention and showing the same inserted in a milk bottle.

Figure 2 is a detail sectional view taken on line 2—2 Figure 1.

Figure 3 is a view similar to Figure 1 of another form of the invention.

Figure 4 is a view similar to Figure 3 of still another form of the invention.

Figure 5 is a detail sectional view taken on line 5—5 Figure 4.

Referring more particularly to the drawings and to the form of the invention shown in Figures 1 and 2, the numeral 10 designates generally a receptacle having both of its ends open. The receptacle may be of any desired configuration and size which will permit it to be inserted into the neck of a bottle 11.

The lower end of the receptacle is contracted as at 12 to form an opening surrounded by a valve seat 13.

Within the receptacle is a ball like valve 14 connected to which is a rod 15. The rod preferably extends above the top of the receptacle and is shaped as at 16 to form a finger grip or loop into which the finger may be inserted for manipulating the valve.

The receptacle 10 is preferably supported by means of a member 17, preferably of rubber or the like which forms a closure for the bottle and also constitutes a support for adjustably holding the receptacle in position.

By adjusting the receptacle with respect to the closure 17, the lower end 12 of the receptacle may be raised or lowered so as to position the inlet at the bottom of the receptacle at a desired point in the bottle, to remove a predetermined quantity of cream therefrom.

Any suitable means may be provided for directing a blast or current of air into the bottle when the receptacle 10 and closures 17 are in position. A suitable and efficient means for this purpose embodies a tubular member 18 preferably of glass, hard rubber or any other suitable material. One extremity of this element 18 is preferably inserted in an opening 19 which passes through the closure 17.

A bulb like device 20 is connected with the other end of the element 18 so that by collapsing and permitting the bulb to again expand, air may be pumped into the bottle so as to force the cream into the receptacle 10, when the valve 14 is unseated.

A valve like device 21 may be provided for controlling the air inlet of the bulb like device 20.

In the form of the invention shown in Figure 3, the receptacle 22 is adapted to be used independently of a blast of air, and the receptacle may be of any desired size and configuration suitable to permit its insertion into the neck of the bottle. Both ends of the receptacle 22 are open and the lower end 23 is contracted to form a valve seat with which a valve 24 co-operates.

A rod 25 is connected with the valve and extends beyond the upper end of the receptacle. The upper extremity of the rod is shaped to form a loop into which a finger may be inserted for manipulating the valve 24.

With this form of the device and in order to remove the cream from the bottle, the receptacle 22 is held in the hand of the operator and the valve 24 unseated before the device is inserted into the bottle. When the valve is unseated the operation of inserting the receptacle into the bottle will cause the cream to flow into the receptacle.

If desired, however, the receptacle 22 may be first inserted into the bottle before the valve 24 is unseated. When used in this manner the unseating of valve 24 will create a slight suction through the lower end of the receptacle which will tend to cause the cream to flow into the receptacle 22.

In the form of the invention shown in Figure 4, a tube like device 27 is adjustably supported by means of a closure 28. Both ends of the tube 27 are open and the upper end is preferably shaped to form a nozzle or spout 29 beneath which a receptacle 30 may be placed to receive the cream discharged through the nozzle.

By adjusting the tube 27 with respect to the closure, the lower end of the tube may be positioned within the bottle to remove the cream to any desired depth.

Another tube like member 31 is supported by the closure 28 and opens therethrough and connected with the other end of the tube 31 is a mouth piece 32, by means of which latter the operator may blow through the tube 31 into the top of the bottle to force the cream into the tube 27 and out of the nozzle 31.

With this improved construction it will be manifest that there will be provided a simple and efficient device for readily removing the cream from the bottle, and which device will be of a sanitary construction and may be readily cleaned when desired.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A cream separator embodying a receptacle having both ends open, said receptacle being adapted to be lowered within the neck of a bottle, said receptacle provided with its lower wall contracted to form a valve seat, a valve within the receptacle for co-operation with the valve seat, and a rod connected with the valve for seating and unseating the valve to close the lower end of said receptacle to control the inflow and outflow of cream into and from the receptacle.

2. A cream separator embodying a receptacle having both ends open, said receptacle being adapted to be lowered within the neck of a bottle, said receptacle provided with its lower wall contracted to form a valve seat, a valve within the receptacle for co-operation with the valve seat, and a rod connected with the valve for seating and unseating the valve to close the lower end of said receptacle to control the inflow and outflow of cream into and from the receptacle, the free end of said rod projecting above the receptacle and shaped to form a finger grip.

3. A cream separator embodying a receptacle having both ends open, said receptacle being adapted to be lowered within the neck of a bottle, said receptacle provided with its lower wall contracted to form a valve seat, a valve within the receptacle for co-operation with the valve seat, a rod connected with the valve to close the lower end of said receptacle to control the inflow and outflow of cream into and from the receptacle, and means co-operating with the mouth of the bottle for supporting the said receptacle for bodily adjustment into and out of the bottle.

4. A cream separator embodying a receptacle having both ends open, said receptacle being adapted to be lowered within the neck of a bottle, said receptacle provided with its lower wall contracted to form a valve seat, a valve within the receptacle for co-operation with the valve seat, a rod connected with the valve for seating and unseating the valve to close the lower end of said receptacle to control the inflow and outflow of cream into and from the receptacle, and means for forcing a blast of air into the bottle exterior of the said receptacle to force the cream into the receptacle when the bottom of the latter is open.

In testimony whereof I have signed my name to this specification this 21st day of January, 1926.

EMERY H. FAHRNEY.